United States Patent

[11] 3,578,837

[72] Inventor Robert E. Brooks
 Redondo Beach, Calif.
[21] Appl. No. 811,805
[22] Filed Apr. 1, 1969
[45] Patented May 18, 1971
[73] Assignee TRW Inc.
 Redondo Beach, Calif.

[54] DOUBLE-DIFFUSER HOLOGRAPHIC SYSTEM
 6 Claims, 2 Drawing Figs.
[52] U.S. Cl. .................................................. 350/3.5,
 350/188, 350/211
[51] Int. Cl. ....................................................... G02b 27/00
[50] Field of Search ............................................ 350/3.5

[56] References Cited
 OTHER REFERENCES

Kogelnik, Bell System Technical Jour, Vol. 44, Dec 1965 pp. 2451— 5 (copy in 350/3.5)

Leith et al., Jour. of the Optical Society of America, Vol. 56 No 4, April 1966 p. 523 (copy in 350/3.5)

Brooks et al., IEEE Jour. of Quantum Electronics, Vol. QE-2, No 8 August 1966 (copy in 350/3.5)

*Primary Examiner*—David Schonberg
*Assistant Examiner*—Ronald J. Stern
*Attorneys*—Daniel T. Anderson, Edwin A. Oser and Jerry A. Dinardo

ABSTRACT: A holographic system for recording holograms of an object in transmission. In order to make more uniform the spatial coherence and the intensity of the light beam of a laser, a light diffuser is disposed in the path of the scene beam. In addition a second light diffuser is also disposed in the path of the diffused and enlarged scene beam. Preferably the second diffuser has a certain directivity which may be achieved by coating the diffusing surface with a transparent lacquer. In order to further improve the directivity of the second diffuser there may be provided a Fresnel lens having one of its focal points in the first diffuser and the other focal point in the recording material for the hologram. The second diffuser may be replaced by a diffusing and reflecting ellipsoidal section which serves simultaneously the purpose of diffusing the scene beam and directing it from the first diffuser to the recording material.

Robert E. Brooks
INVENTOR

ATTORNEY

DOUBLE-DIFFUSER HOLOGRAPHIC SYSTEM

CROSS-REFERENCE TO RELATED APPLICATION

The present application may be considered to be an improvement of a prior application to Charles H. Ernst and Martin D. Cowley entitled A NEW OPTICAL ELEMENT FOR PULSED LASER HOLOGRAPHY filed on Nov. 21, 1968, Ser. No. 777,852 and assigned to the assignee of the present application. This Ernst, et al. application discloses a holographic system provided with a single diffuser.

BACKGROUND OF THE INVENTION

This invention relates generally to holography, and particularly relates to a holographic system for recording holograms of a transilluminated object and having more uniform spatial coherence and light intensity.

As explained in the Ernst et al. application previously referred to, much improved holograms can be obtained of objects in reflection by utilizing a laser having at least a mode selector and a single diffuser in the scene beam. This makes it possible to obtain superior holograms by means of a pulsed laser having a large light output but which does not generate light with exceptional coherence. A laser with a high light output is required, particularly for taking holograms in reflection because otherwise the object does not reflect enough light to record holograms with the low sensitivity, high resolution photographic plates required.

It is believed that when a hologram is taken of an object in reflection, that the object in turn diffuses the light once again. Therefore, in accordance with the present invention, it has been found that superior holograms may be made of objects in transmission by utilizing two diffusers in the scene beam. This again makes it possible to utilize a high light output laser of the type which does not have the high degree of coherence otherwise required.

It is accordingly an object of the present invention to provide an improved holographic system for recording holograms of objects in transmission without requiring a laser having a high degree of spatial coherence.

A further object of the present invention is to provide a holographic system of the type referred to which permits utilization of a pulsed laser preferably having a mode selector and which requires a minimum of optical components.

Another object of the present invention is to provide, for a holographic system of the type referred to, a light diffuser which scatters the light in a forward direction toward the object to be recorded and direct it toward the recording plate.

SUMMARY OF THE INVENTION

A holographic system in accordance with the invention serves the purpose of recording an object in transmission. The system provides more uniform spatial coherence and amplitude distribution. To this end there is provided a laser for developing a substantially monochromatic light beam which normally yields holograms having a spotty and irregular background. A conventional beam splitter is provided for splitting the light beam into a reference beam and a scene beam. A photosensitive material is disposed in a predetermined plane for recording a hologram. This may, for example, consist of a photographic film or plate, of a photochromic material or other suitable photosensitive material. First optical means are provided for directing the reference beam toward the recording material. Further optical means are provided for directing the scene beam toward the hologram. A first light diffuser is disposed in the path of the scene beam. In other words, the first light diffuser is in the path of the unenlarged scene beam. Finally third optical means are disposed in the path of the diffused scene beam. This serves the purpose of directing the scene beam toward substantially the entire surface of the recording material and includes a second diffuser. As a result, there is a portion of the scene beam which is capable of interfering with a portion of the reference beam on substantially every point of the recording material illuminated by the reference beam. Accordingly, spatial coherence between reference and scene beams at any point on the hologram is more uniform; so is the light intensity.

Preferably, but not necessarily, the laser may be provided with a mode selector for improving its coherence. It should be understood however that a laser with a mode selector is not required for the holographic system of the present invention, as will be more fully explained hereafter. Also the second light diffuser preferably consists of a diffusing glass plate having its diffusing surface covered with a layer of transparent material having an index of refraction between that of the glass and air.

The novel features that are considered characteristic of this invention are set forth with particularlity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1:
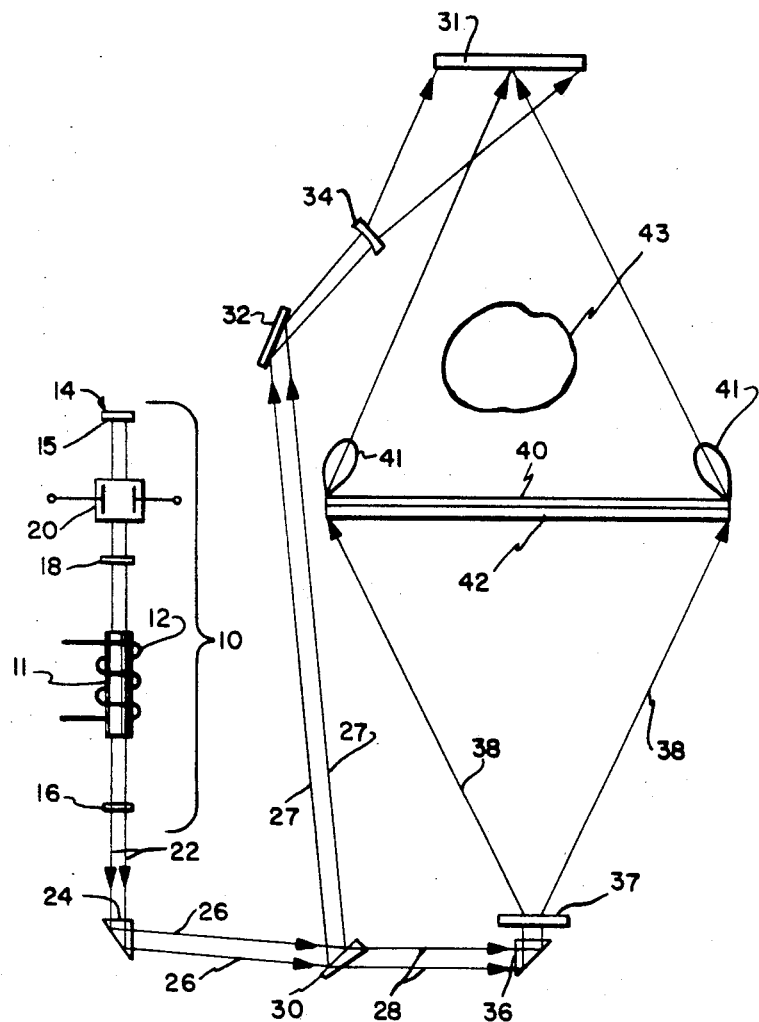
FIG. 1 is a schematic representation of a laser and holographic system embodying the present invention.

Referring now to the drawings, wherein like elements are designated by the same reference characters, and particularly to FIG. 1, there is illustrated a holographic system in accordance with the present invention. The system includes a laser generally indicated at 10. Preferably, although not necessarily, the laser is of the pulsed type so that it has a very large light output in a short time period. Accordingly, the laser may, for example, be a ruby laser including a ruby rod 11 surrounded by a suitable flash lamp 12 for exciting or pumping the laserable material into an upper excited state.

The laser includes a resonant cavity consisting of a mirror 14 having its front surface 15 made reflecting, for example, by a layer of silver. Accordingly the mirror reflector 14 reflects substantially all of the light. The other end of the cavity is formed by a resonant reflector 16 which is designed to transmit a substantial portion of the light. The resonant reflector 16 serves as a mode selector. In other words, it selects a particular mode or very narrow frequency range of the laser beam and transmits only light of the selected mode or frequency range. Such a resonant reflector 16 may, for example, consist of a sapphire flat. This may, for example, have a thickness of 2 millimeters. Sapphire is a gem corundum which is chemically alumina or $Al_2O_3$. Sapphire is a transparent material having a high index of refraction.

Instead of a resonant reflector such as shown at 16 it is also feasible to utilize other known mode selectors. Another such mode selector consists of a dye cell filled with a bleachable substance which is a photochromic material. Such dye cells are obtainable in the trade and have been disclosed in the prior Ernst, et al. application above referred to. A mode selector such as a resonant reflector 16 or a dye cell is not necessary for the operation of the system of the present invention. A mode selector may be required where there is optical mismatch between portions of the scene and reference beams arriving at a particular point on the hologram. However if the holographic arrangement is such that a small diffuser is used relatively far away from the hologram and where the angle between the reference and scene beams at the hologram is relatively small, a mode selector may usually be dispensed with. In that case only frequency selection is that afforded by the resonant cavity formed by the mirrors 14 and 16 and the laser material.

The laser may also be provided with a so-called Q-switch.

The Q-switch as shown in FIG. 1 may, for example, include a light polarizer 18 and a Kerr cell 20. The purpose of the Q-switch is to be able to generate a substantially monochromatic light beam at a precise, predetermined moment with an extremely short duration.

The polarizer 18 serves the purpose to polarize the laser light linearly. The Kerr cell 20 may be filled with a suitable material such as nitrobenzine and may be arranged to rotate the plane of polarization when a suitable potential is applied to its electrodes. Accordingly when the laser initially begins to generate light it will pass the polarizer 18 where it is linearly polarized. In passing through the Kerr cell 20 twice the plane of polarization will be rotated in such a manner that the light reflected by the reflector 14 will be unable to pass the polarizer 18 again. At some predetermined moment the electric potential is removed from the Kerr cell 20 so that there is no longer an electric field in the cell. Accordingly the plane of polarization of the laser beam is not changed by passing through the Kerr cell and subsequently the light is able to pass back through the polarizer 18 and issue from the resonant reflector 16.

It should be noted that the use of a Q-switch in the laser 10 is optional. Experiments have shown that good holograms may be obtained without the use of the Q-switch. The use of at least one mode selector, such as a resonant reflector 16 or a bleachable dye cell is desirable but not necessary as explained above. However better holograms are presently obtainable with the type of laser shown in FIG. 1 if it does include a mode selector.

It should be noted that the mode selector 16 operates in the fashion of a Fabry-Perot interferometer, which transmits say on the order of 70 percent of the light. The use of the Q-switch has the advantage that it is possible to synchronize the light with some high-speed phenomenon to be observed or recorded.

Accordingly a substantially monochromatic light beam 22 issues from the laser 10. This light beam should have good temporal coherence but has spatial coherence which is not uniform enough. It is the aim of the present invention to make use of such a laser beam 22 with nonuniform spatial coherence and to obtain superior holograms of objects in transmission.

The laser beam 22 may now be deflected by a reflector 24. The reflector 24 as shown may consist of a prism which reflects the light beam by total reflection. The laser beam 26 emerging from the reflector 25 is now split into a reference beam 27 and a scene beam 28. This is accomplished by a beam splitter 30. The beam splitter 30 as shown may consist of a wedge of glass. Accordingly the bulk of the light intensity forming the scene beam 28 passes through the beam splitter 30 while a small percentage, say 10 percent, is reflected from the front surface of the glass wedge 30 to form the reference beam 27.

The reference beam is directed toward the recording material 31. This is a photosensitive material such as a photographic film or plate. Alternatively it may consist of a photochromic material or any other photosensitive material for recording a hologram. The reference beam 27 is directed toward the recording material 31 by another reflector 32. This may, for example, consist of a front surface mirror, that is, a mirror the front surface of which is coated with a suitable reflecting layer such as silver.

Preferably the reference beam 27 is diverged or enlarged by means of a diverging lens 34. The lens 34 may, for example, be a negative lens as shown to develop an enlarged reference beam having such a size that it will substantially cover the entire surface of the recording material 31. In lieu of the negative lens 34 it is also feasible to use a positive lens having a focal point between the lens 34 and the recording material 31 so that the reference beam is sufficiently enlarged.

Referring now to the scene beam 28 this is reflected by another reflector 36 which may be identical to the reflector 24. In accordance with the present invention a first light diffuser 37 is disposed in the path of the unenlarged scene beam 28. The first differ 37 may consist of any suitable and conventional material such as a frosted or sandblasted glass plate. This will, of course, diffuse the light beam as indicated generally at 38 and direct it toward a second light diffuser 40 disposed in the path of the diffused or spreadout scene beam 38.

The second diffuser 40 is designed in such a manner that it will scatter the diffused light in a forward direction. This is shown by the lobes 41 which generally indicate the radiation pattern. The lobes 41 may be considered to be a vector pattern of the light intensity.

Such a light diffuser may be obtained by utilizing a piece of frosted or sandblasted glass which has been coated with a layer of clear or transparent lacquer. The lacquer preferably has an index of refraction between that of the glass plate 40 and air. Accordingly an incident ray of light scatters into a narrow, angular cone in a forward direction, that is in the direction of the incident ray. The cone of light preferably is large enough so that an incident ray directed toward the center of the recording material 31 scatters uniformly over the entire surface of the recording material without extending too far beyond the outer edges.

Further, in accordance with the present invention, there is preferably provided a lens 42. The lens 42 preferably has its focal planes in or in the neighborhood of the first diffuser 37 and in or in the neighborhood of the recording material 31. In order to minimize the size and the expense of the lens it is preferred to utilize a Fresnel lens. This also serves the purpose to direct the diffused light toward the recording material 31. Thus it would converge the scene beam in the absence of the light diffuser. The action of the two light diffusers 37 and 40 is such that there is at least a component of the scene beam 38 at every point on the recording material 31 which is coherent with at least a portion of the reference beam. In other words, there should be at every point of the recording material 31 a component of the scene beam and a component of the reference beam which are capable of interfering with each other and hence, creating an interference pattern on the recording material 31 which, of course, forms the hologram. Also, the light intensity at any point of the hologram is made more uniform by the two light diffusers. The hologram is recorded of an object 43 disposed in the space between the second diffuser 40 and the recording material 31. The order of the lens 42 and diffuser 40 may be reversed.

This operation of the holographic system of the invention may be explained by taking an arbitrary reference ray at any selected point on the hologram. This point receives light from all directions of the second light diffuser 40. Each point on the second light diffuser 40 in turn receives light from all portions of the first light diffuser 37. Consequently this must include some scene light which is coherent with the reference beam at the selected point on the hologram. It should be noted that path length matching is important to obtain temporal coherence. This is effected by the arrangement shown in FIG. 1.

It should be noted that the homogenization of spatial coherence effected by the holographic system of the present invention causes excess light to exist at the recording material 31 which may not be coherent. However, holograms are quite insensitive to the presence of this undesired and unwanted light. They substantially respond only to the recorded interference pattern on the recording material and are therefore substantially insensitive to the presence of the excess light which may uniformly darken the photographic plate.

By way of example, good holograms have been obtained with a size of the recording material 31 of 4×5 inches. The distance between the recording material 31 and the Fresnel lens 42 was 48 inches and the same distance of 48 inches was between the Fresnel lens 42 and the first diffuser 37. The necessary size of the Fresnel lens 42 and the second diffuser 40 is 20×25 inches. Accordingly the space for the object 43 has an approximate cross section of 20×25 inches and length of 48 inches.

In order to save weight the Fresnel lens 42 may consist of a plastic material. It should be noted that the lens 42 need not be of good optical quality because the light is diffused in any case.

Figure 2:
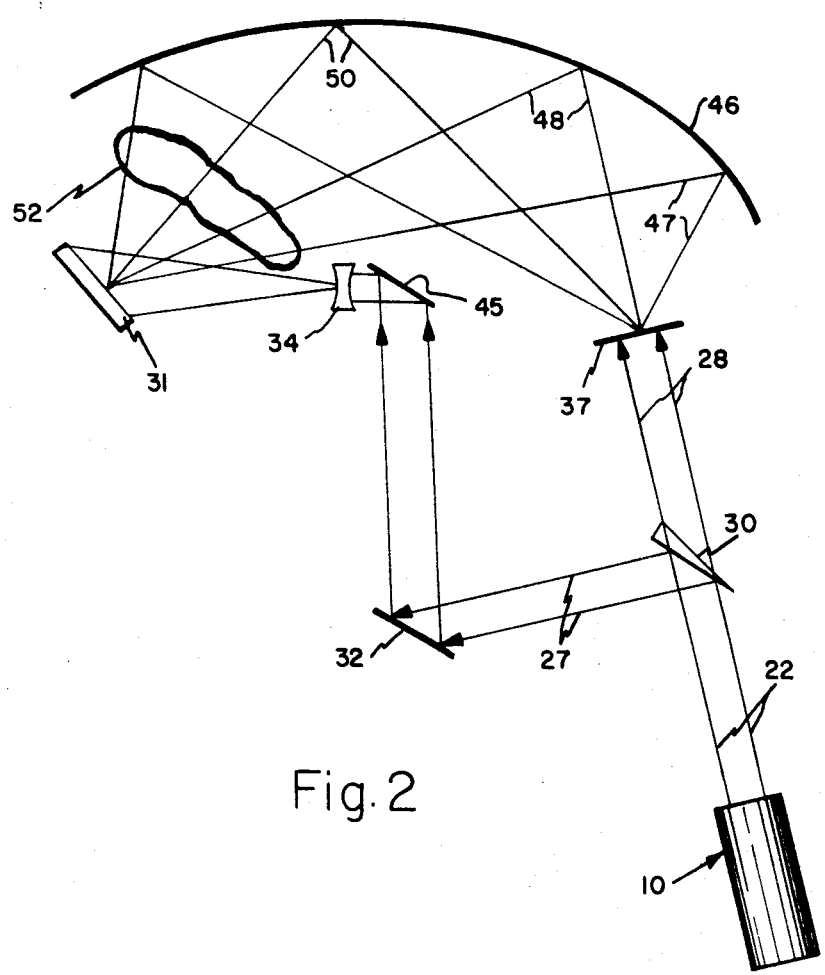
FIG. 2 is a schematic representation of a modification of the holographic system of the invention, including an ellipsoidal section for diffusing and directing the scene beam toward the recording material.

Another embodiment of the present invention which combines an optical element for directing the scene beam toward the recording plate and the diffuser is illustrated in FIG. 2. Here a laser 10 generates a beam 22 which is split by the beam splitter 30 into a reference beam 27 and a scene beam 28. The reference beam 27 is reflected first by a reflector 32 and then by a second reflector 45 and may be enlarged by a negative lens 34 to cover substantially the entire surface of the recording material 31.

The scene beam 28 is initially diffused by the first diffuser 37. From there the light is directed and diffused again toward the recording material 31. This may be effected by the ellipsoidal section 46 serving as a second reflector and director of the beam. The ellipsoidal section 46 consists of a surface of revolution formed by rotation of an ellipse.

The ellipsoidal section 46 has one of its focal points in the first light diffuser 37 and the other in the recording material 31. It is well known that different paths such as 47, 48 and 50 between the two focal points of an ellipse and its periphery are equal in length. Thus the ellipsoidal section serves the purpose to provide light paths of equal length.

The ellipsoidal section 46 is made of some suitable material so as to diffuse or scatter and reflect the light. For example, the section 46 may consist of magnesium oxide $MgO_2$. Alternatively it may consist of a suitable mirror covered with frosted glass. Another possibility is to utilize a frosted glass section of the proper shape and aluminize the surface to obtain sufficient reflection. The object 52 may be disposed adjacent the recording material 31 in the path of the light rays reflected from the section 46.

The holographic system of the invention as illustrated in FIG. 2 operates in essentially the same manner as does that of FIG. 1. It should also be noted that the provision of two separate diffusers serves the purpose to equalize the amplitudes or intensities of a scene beam at every point of the hologram. It is a well-known property of a laser that its light intensity or amplitude across a cross section thereof is not always entirely uniform. This is particularly true of a solid laser, such as a ruby laser.

There has thus been disclosed a holographic system for recording holograms of an object in transmission. The system is characterized by the provision of two light diffusers in the path of the scene beam. One diffuser is interposed into the path of the undiffused or unenlarged scene beam. The second diffuser is preferably arranged in such a manner as to scatter the light in a forward direction. The focusing of the scattered light may be implemented by the provision of a lens having its focal planes in the first light diffuser and in the recording material. Preferably such a lens is a Fresnel lens to minimize the weight and expense of the lens. With this holographic system it is feasible to obtain excellent holograms of relatively large size of objects in transmission.

I claim:

1. A holographic system for recording an object in transmission comprising:
   a. a laser for developing a substantially monochromatic light beam;
   b. a beam splitter for splitting said light beam into a reference beam and a scene beam;
   c. a photosensitive recording material disposed in a predetermined plane for recording a hologram;
   d. first optical means for directing said reference beam toward said recording material;
   e. second optical means for directing said scene beam toward said hologram;
   f. a first light diffuser disposed in the path of said scene beam for diffusing said scene beam; and
   g. third optical means disposed in the path of said diffused scene beam for approximately focusing said first light diffuser on said recording material and for directing said scene beam toward substantially the entire surface of said recording material and including a second diffuser, an object to be recorded being adapted to be disposed between said third optical means and said recording material, whereby said scene beam is diffused twice by said diffuser so that on substantially every point of said recording material a portion of said scene beam is capable of interfering with a portion of said reference beam.

2. A holographic system as defined in claim 1 wherein said second diffuser consists of a diffusing glass plate having its diffusing surface covered with a layer of transparent material having an index of refraction between that of said glass plate and air.

3. A holographic system as defined in claim 1 wherein said third optical means includes a Fresnel lens having its focal planes substantially in said first diffuser and in said recording material.

4. A holographic system as defined in claim 1 wherein said third optical means includes a substantially ellipsoidal section for reflecting and diffusing the light toward said recording material, said ellipsoidal section having its focal points substantially in said first diffuser and in said recording material.

5. A holographic system for recording an object in transmission comprising:
   a. a laser for developing a substantially monochromatic light beam;
   b. a beam splitter for splitting said light beam into a reference beam and a scene beam;
   c. a photosensitive recording material disposed in a predetermined plane for recording a hologram;
   d. optical means including a reflector for directing said reference beam toward said recording material;
   e. a first diffuser interposed into the path of said scene beam; and
   f. a reflective light diffuser having the shape of a substantially ellipsoidal section having its focal points in said first diffuser and in said recording material for directing and diffusing the scene beam toward said recording material, an object to be recorded being adapted to be disposed between said reflective light diffuser and said recording material whereby the light of said scene beam is scattered twice by said first and reflective light diffuser so that on substantially every point of said recording material there exists a portion of said scene beam capable of interfering with a portion of said reference beam.

6. In a holographic system for recording an object in transmission of the type comprising a laser for developing a substantially monochromatic light beam, a beam splitter for splitting the light beam into a reference and scene beam, a photosensitive recording material for recording a hologram, means for directing the reference beam toward the recording material, means for directing the scene beam toward the hologram, a first light diffuser disposed in the path of the scene beam for diffusing the scene beam and a lens in the path of the scene beam for approximately focusing the first diffuser on the recording material, the improvement comprising:
   a second light diffuser interposed in the path of the diffused scene beam and ahead of an object to be recorded, said light diffuser directing the scene beam in a forward direction toward the entire surface of the object to be recorded, said light diffuser consisting of a diffusing plate having a transparent layer on its diffusing surface, said layer having an index of refraction between that of said plate and air.